United States Patent

[11] 3,542,098

[72] Inventor  Daniel Hill
               Kelowna, British Columbia, Canada
[21] Appl. No. 735,381
[22] Filed     June 7, 1968
[45] Patented  Nov. 24, 1970
[73] Assignee  Crown Zellerbach Canada Limited
               Vancouver, British Columbia, Canada
               a corporation of Canada

[54] SAWYER'S PROTECTIVE DEVICE
     3 Claims, 3 Drawing Figs.
[52] U.S. Cl. .................................................. 143/159,
                                              143/157; 144/251
[51] Int. Cl. ................................................. B27g 19/06
[50] Field of Search ......................................... 143/157,
           159, 159-2, 159-7, 159-11, 124, 25, 25.1, 52, 54,
                                  54.1; 144/252, 252.1, 251

[56]           References Cited
          UNITED STATES PATENTS
1,494,342   1924   Cramer .......................  143/159
2,696,853   1954   Balch et al. ..................  143/124X Primary Examiner—Andrew R. Juhasz
Assistant Examiner—James F. Coan
Attorneys—William T. Nye, Corwin R. Horton and John O. Reep ABSTRACT: A rotatable, disc-shaped screen is positioned between a sawyer's control station and a work station where a saw severs a log. Debris such as chips, bark and sawdust flung from the saw does not pass through the screen when the screen is rotating; yet, the sawyer is able to effectively view the saw at the work station through the screen.

Patented Nov. 24, 1970
3,542,098
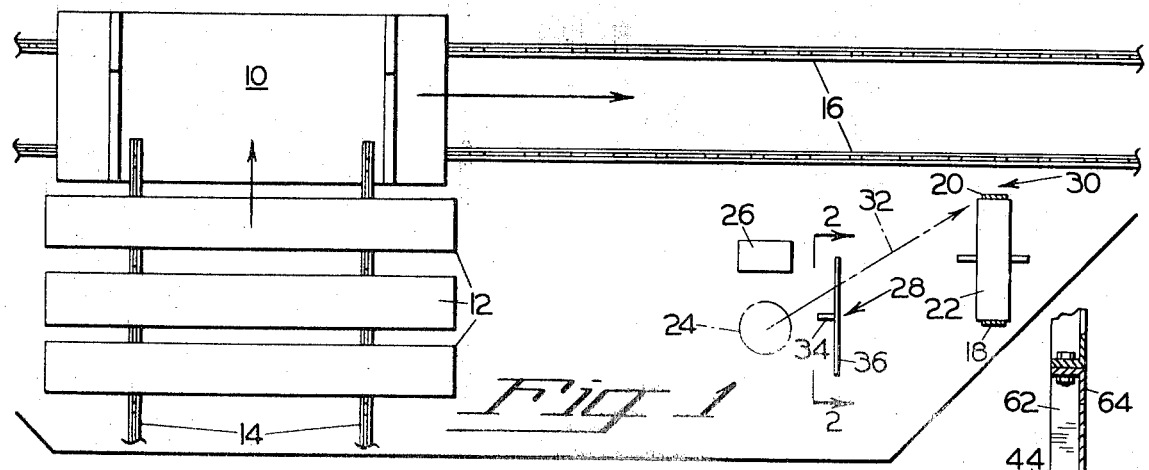
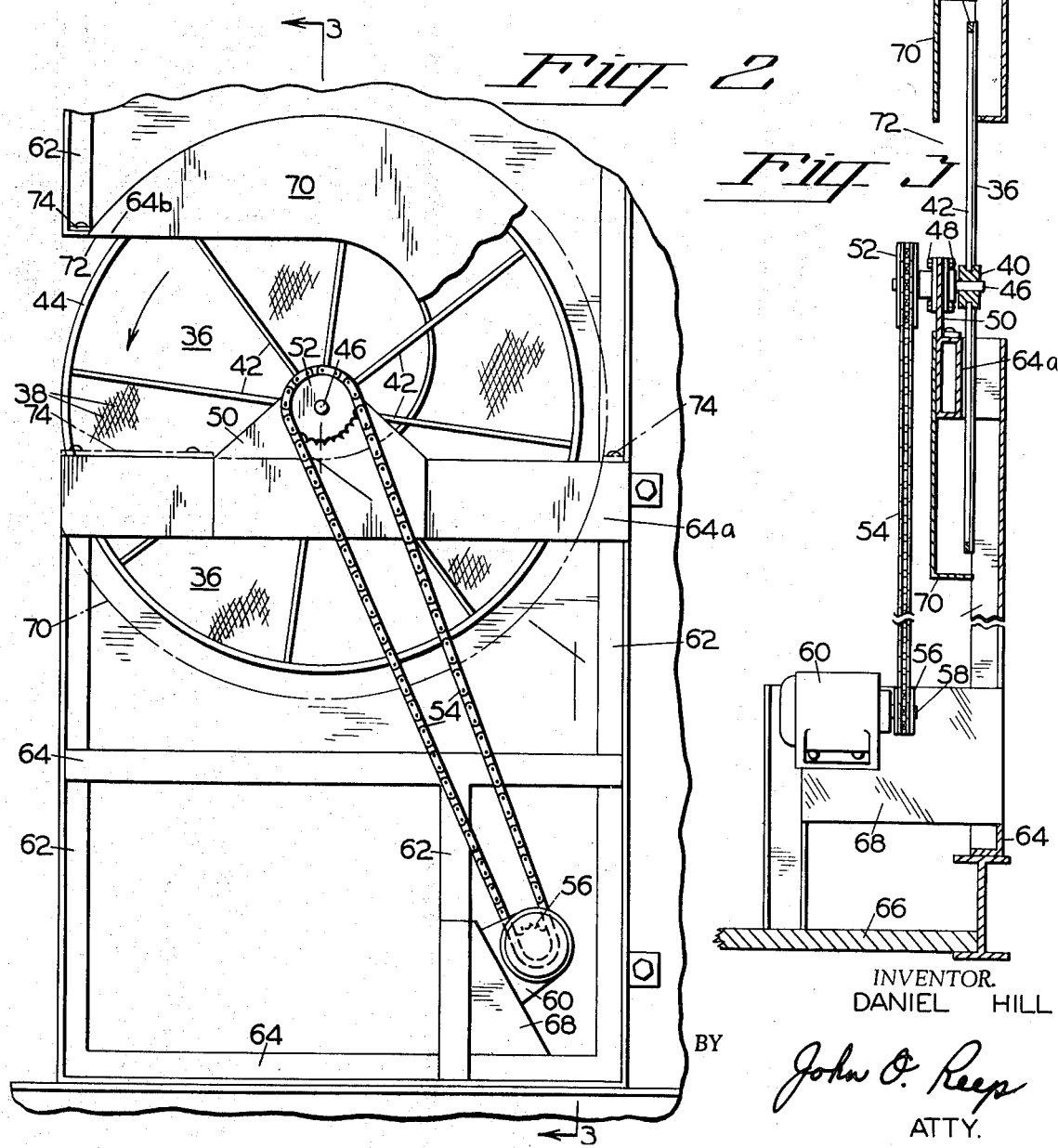
INVENTOR.
DANIEL HILL
BY John O. Reep
ATTY.

SAWYER'S PROTECTIVE DEVICE

BACKGROUND OF THE INVENTION

The present invention relates to protective devices positioned between a control or operating station and a work station for protecting a machine operator at the control station from debris emanating from an article being worked on at the work station remote from the operator. Reference will primarily be made hereinafter to the invention as applies to protection of a sawyer from flying wood particles while the sawyer is at a control station where control is exercised on the sawing of a log at a work station remote from the operator. It is to be understood, however, that the invention also has usefulness in other operations wherein protection from flying particulate debris is needed for a machine operator while still permitting the operator to see through the protective device.

It is a common operation in a sawmill to position a log on a carriage and then move the carriage along a trackway to a band saw so that the saw will sever the log longitudinally in removing a slab or cant from the log. Then, the carriage is retracted, the log repositioned and another slab or cant is removed from the log. Positioning of the log on the carriage, and movement of the carriage to the saw is controlled by a sawyer at a control station remote from the saw. It is desirable that the sawyer be able to view the saw during each cutting operation, but there is also a need to protect the sawyer from flying particulate debris, such as wood particles which are flung from the saw while the saw is cutting through the log.

In the past, shields made of shatterproof glass or plastic have been used for protective barriers. While glass or plastic provide protection and visibility, problems are encountered because materials such as wood chips may be moist and tend to adhere to the glass or plastic surface when they impinge thereon. Thus, some manner of relatively frequent cleaning is needed to assure continuing visibility, and this cleaning time may result in diminished production. Stationary open-mesh screens have also been used as barriers; however, a rather fine mesh is needed to prevent small particles from passing through the screen. Such fine mesh, in addition to reducing the visibility through the screen, also may be rather prone to become clogged with particles and require frequent cleaning to assure continuing visibility through the screen.

SUMMARY

It is therefore a primary object of the present invention to provide a protective barrier suitable for use for the purpose indicated and which serves effectively as a barrier against particulate matter passing therethrough, affords good visibility through the barrier, and minimizes machine downtime needed to clear particles from the barrier.

Briefly stated, in accordance with one aspect of the present invention, a protective barrier has openings therethrough (e.g. a screen). The barrier is located between an operator and a work station and is mounted and supported for rotation about a central axis. Because of the openings in the barrier, the operator is able to view the workstation, yet the rotation of the barrier effectively prevents flying particles which emanate at the work station from reaching the operator. Rotation of the screen permits larger screen openings to be used than would otherwise be the case if the screen were stationary. Furthermore, such rotation tends to make the barrier self-cleaning in the sense of ridding itself by centrifugal force of most particles that otherwise may tend to adhere thereto, especially if the particles are moist.

BRIEF DESCRIPTION OF THE DRAWING

FIG. 1 is a diagrammatic plan view illustrating a log-sawing system embodying the present invention;

FIG. 2 is an enlarged front elevational view of the protective device of the present invention taken along lines 2–2 of FIG. 1, with parts broken away for clarity; and FIG. 3 is a sectional view taken on lines 3–3 of FIG. 2.

DETAILED DESCRIPTION

Referring first to FIG. 1, there is diagrammatically depicted a machinery layout in sawmill wherein a carriage 10 receives logs 12 from a log deck 14, and the carriage is moved along trackway 16 to a band saw 18. The band saw 18 is of a well-known construction wherein an endless flexible metallic band having a cutting edge 20 is mounted for rotation about vertically spaced drums 22 (only one of the drums being illustrated at FIG. 1). A disc-shaped circular saw is sometimes used instead of a band saw.

With a log 12 securely mounted on the carriage 10, the carriage is moved to the right (as viewed at FIG. 1) along trackway 16. The moving edge 20 of the saw is so positioned relative to the log which is mounted on the carriage that continuous advancement of the carriage 10 causes the saw 18 to move longitudinally through the log 12 to remove from the log a slab or cant of desired dimension. Such slab or cant may, if desired, be later cut to dimension lumber. After each slab or cant is removed from the log, the carriage 10 is moved to the left (as viewed at FIG. 1) until the log is clear of the saw. Then, after repositioning the log, the carriage and log again move to the right under the control of the operator to sever another slab from the log.

Movement of the carriage 10 along trackway 16, and the positioning and repositioning of each log 12 on the carriage is controlled by a machine operator (called a sawyer) at an operating or control station 24. Appropriate switching and indicating instruments are mounted on a control panel 26.

The sawmill operation just described is conventional and has only been described to set the background for one environmental operation where the present invention has effectively been used, as will now be pointed out. The present invention is specifically concerned with a protective device or barrier 28 positioned between the control station 24 and the work station 30 where the saw cuts the log. A need for such a protective barrier exists because the saw 18 moves rapidly through the log and flings wood particles in random direction from the saw. It is necessary to provide protection for the machine operator at the operating station 24 from being accidentally hit by such flying particles. Still, it is desirable that the operator be able to view the saw 18 to make certain that proper cutting is taking place, and to be able to rapidly ascertain when repositioning of the log is necessary.

As depicted at FIG. 1, the barrier 28 is located in a plane which crosses the line of sight 32 of the operator between the operator's station 24 and the work station 30, and the barrier has openings therethrough which permits the operator to view the work station. The barrier is rapidly rotated about a central axis 34 so that large enough openings can be used to promote good visibility through the barrier, yet such rotation precludes small particles from passing therethrough.

In preferred form, as seen most clearly at FIGS. 2 and 3, the barrier 28 is in the shape of a disc-shaped screen 36. It has been found that an expanded metal-type screen, approximately 38 inches in diameter, having diamond-shaped openings 38 (each opening being about 1 inch long and ½ inch wide) has worked effectively in a sawmill for preventing sawdust and chips from passing therethrough. It is to be understood, however, that screens of different mesh size may well be used, depending on the needs of the particular operation, and the mesh size is not critical so long as it permits good visibility and prevents the debris from passing therethrough when the screen is rotated.

In further description of the protective barrier construction, the screen 36 is supported from a central hub 40 through the medium of a plurality of metallic spokes 42 secured at their inner end to the hub 40. An annular metallic band 44 is secured to the outer end of the spokes 42 and provides support for the outer edge of the screen 36.

As mentioned above, the screen is rotatable, and so the hub 40 is secured to one end of a circular shaft 46. The center axis of the shaft 46 provides the aforementioned axis of rotation 34 of the screen. Means are provided to support the barrier for rotation, and to accomplish this the central portion of the shaft 46 between opposite ends thereof is supported for rotation through appropriate bearing structure 48 from a plate 50 forming a part of the supporting framework.

A driven sprocket 52 is secured at the opposite end of the shaft 46 from the hub 40, and an endless drive chain 54 is entrained about the sprocket 52 and about a drive sprocket 56 secured at the end of a shaft 58 which is driven by motor 60. The motor 60 is fixedly mounted near the base of the supporting framework. The speed at which the motor shaft 58 is driven and the size of the sprockets 52 and 56 determines, of course, the rotational speed of the screen 36. In actual practice, it has been found that by rotating a screen 36 of the type described above at about 900 revolutions per minute good visibility is obtained, chips and sawdust are effectively prevented from passing through the screen and the screen remains relatively clean from the chips and sawdust adhering thereto. As with the screen mesh size, the specific rotational speed is not thought to be critical so long as visibility is obtained, and rotational speed is great enough to prevent flying debris from passing through the screen. Alternate screen driving means, such as belts and hydraulic motors, may be used so long as they do not unduly interfere with the operator's ability to view through cutout portion 72.

The supporting framework for the protective device comprises vertical frame members 62, and horizontal frame members 64 which are supported on a building floor 66 or other supporting surface. A motor support plate 68 is rigidly connected between a vertical member 62 and horizontal member 64 near the base of the device. A center horizontal supporting beam 64a which is connected to and extends between two of the vertical frame members serves as a means to which the plate 50 is attached which, as mentioned above, provides the support for rotating shaft 46.

The supporting beam 64a also provides means to attach a stationary metallic shield 70 on the operator side of the rotating screen 36 to prevent the operator from accidentally encountering the screen. Only a portion of the shield 70 is illustrated in full lines at FIG. 2, the remainder appearing in phantom outline. The shield 70 is generally circular and slightly greater in diameter than the screen 36, except the shield 70 has a generally U-shaped cutout portion 72 at the eye level of the operator. The cutout portion 72 is sufficiently large to permit ease in looking through the rotating screen 36 to the work station 30 from the operator's station 24. Flanges 74 on the shield 70 are secured to the horizontal supporting members 64a and 64b at spaced locations. While not specifically illustrated, it is to be understood that, if desired, an elongated shield may be positioned around the moving chain 54.

From the above, it should be clear that the present invention has provided a protective device in the form of a barrier through which good visibility is obtained because of the openings therethrough, is effectively preventing debris from passing through the barrier because the barrier is rotated, and the rotation also aids in maintaining the barrier free of particulate debris being adhered thereto.

While the foregoing specification has set forth an embodiment of the present invention in detail for purposes of making a complete disclosure thereof, various other embodiments and modifications will occur to those skilled in the art, but will fall within the spirit and scope of the invention defined in the following claims.

I claim:

1. A protective device for protecting a machine operator from flying debris emanating from a work station remote from the operator, said protective device comprising:
   a. a barrier having openings therethrough and adapted to be positioned between the operator and the work station in a plane which crosses the line of sight of the operator for the operator to view the work station through the openings;
   b. means rotatably supporting the barrier for rotation about a central axis through the barrier; and
   c. means for rotating the barrier about the central axis thereof at a speed sufficient to preclude flying debris from passing through the openings and reaching the operator while still permitting the operator to view the work station through the openings in the rotating barrier.

2. The device as set forth in claim 1 wherein the barrier comprises a generally disc-shaped screen.

3. The device as set forth in claim 1 which further includes a stationary shield positioned between the operator and the barrier for shielding the operator from contacting the rotating barrier, said shield having an opening therethrough at the level of sight of the operator at the operating station.